UNITED STATES PATENT OFFICE 2,243,617

AZO DYESTUFFS AND PROCESS OF MAKING SAME

Gérald Bonhôte, Basel, and Carl Apotheker, Riehen, Switzerland, assignors to the firm Society of Chemical Industry in Basle, Basel, Switzerland No Drawing. Application February 19, 1940, Serial No. 319,811. In Switzerland March 8, 1939

5 Claims. (Cl. 260—185)

It has been found that new azo dyestuffs, containing at least two azo groups, are obtained if diazo compounds, which are free from sulphonic acid or carboxyl groups, are allowed to react on aminoazo dyestuffs, which are equally free from sulphonic acid and carboxyl groups, and which possess the general formula

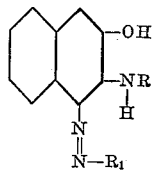

in which R represents hydrogen, alkyl or aryl and $R_1$ represents aryl.

The amino-azo dyestuffs which here come into consideration may be obtained by allowing diazo compounds, which are also free from sulphonic acid and carboxyl groups, to react with 2-hydroxy-3-aminonaphthalene, as well as with its N-monomethyl, N-monoethyl, N-monobutyl, N-monophenyl, N-mono-α- or N-mono-β-naphthyl derivatives. These alkyl or aryl radicals may, of course, be substituted, for example, the phenyl radical may be substituted by methyl groups, methoxy or ethoxy groups. The phenyl nucleus may also carry other substituents, such as chlorine atoms.

Diazo compounds which come into question in the manufacture of the parent dyestuffs are, for example: aniline, ortho, meta and para toluidine, ortho, meta and paraphenetidine, and naphthylamine, 2:5-dimethoxy- or diethoxy-aniline, 1-amino-2-methoxy- or 1-amino-2-ethoxy-5-methyl benzene, 1-amino-2-methyl-4-methoxy or 1-amino-2-methyl-4-ethoxy-benzene, ortho, meta and para chloraniline, ortho, meta and para nitraniline, 2:5-dichloroaniline, 1-amino-2-methoxy-4-nitrobenzene or 1-amino-2-methoxy-5-nitrobenzene, 1-amino-2-methyl-4-nitrobenzene or 1-amino-2-methyl-5-nitrobenzene, 1-amino-2-methyl-4-chlorobenzene or 1-amino-2-methyl-5-chlorobenzene, 1-amino-2-nitro-4-methyl-benzene, 1-amino-2-nitro-4-chlorobenzene, 1-amino-2-nitro-4-methoxy-benzene, amino-azo-benzene, etc.

The azo dyestuffs used as parent substances in the present process thus possess the property of uniting with diazo compounds to form new azo-dyestuffs which contain at least two azo groups. Moreover, the parent dyestuffs are soluble in dilute aqueous solutions of the caustic alkalis, in spite of their high molecular weights. Such solutions are very well adapted for use as preparing baths for the preparation of the fibre in the production of insoluble azo dyestuffs on the fibre, because the parent dyestuffs possess a quite surprising affinity for vegetable fibres from such baths.

For the preparation of the new dyestuffs which are the subject of the present invention, such diazo compounds come into consideration as, as has already been mentioned, contain neither sulphonic acid nor carboxyl groups; for example, those of aniline, its homologues, analogues or substitution products, such as 2:5-dichloroaniline, 1-amino-2-methoxy-5-nitrobenzene, 4-chloro-2-amino-1:1'-diphenylether, 4:4'-dichloro-2-amino-1:1'-diphenylether; further, the diazo compounds from chlorotoluidines, such as 4-chloro-2-methyl-1-aminobenzene; from nitranilines, such as 4-chloro-1-amino-2-nitrobenzene, 1-amino-2-methyl-4-nitrobenzene, 1-amino-2-methoxy-4-nitrobenzene, 1-amino-2-nitro-4-methoxybenzene; from α or β naphthylamine and their substitution products, and the like; furthermore, those diazo compounds from monoacylation products derived from 2:5-diaminohydroquinone-diethyl- or -di-methyl-ether and benzoyl chloride or aryloxy-acetic acid chlorides; from amino-azo dyestuffs, such as, for example, 4-aminobenzene, 4-amino-3:2'-dimethylazobenzene, 4-amino-5-methoxyazobenzene, 4-amino-2:5-dimethoxyazobenzene, 4-amino-4'-nitro-2:5-dimethoxyazobenzene, 4:4'-diamino-2-methyl-5-methoxyazobenzene, and the like.

The dyestuffs obtained from such diazo compounds correspond to the general formula

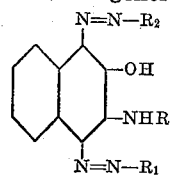

wherein R stands for a member of the group consisting of hydrogen, alkyl and aryl, $R_1$ stands for aryl, and $R_2$ also stands for aryl, and are suited for the preparation of lakes and pigments. They are particularly valuable when they are manufactured on a substrate, such as textile fibres. According to the choice of diazo compound, shades of bordeaux-red, brown, violet, blue or black are obtained, the purity and fastness properties of which may be excellent.

The following examples, which may be increased at will, illustrate the invention, without in any way limiting it, the parts being by weight:

Example 1

16.2 parts of 2:5-dichloroaniline are diazotized in the usual manner and are added to a solution containing 26.3 parts of 1-phenylazo-2-amino-3-hydroxynaphthalene, 30 parts of caustic soda solution of 36° Bé. strength, 15 parts of anhydrous sodium carbonate, and 2000 parts of water. The garnet-red dyestuff formed is at once precipitated and is filtered and dried. It possesses the formula

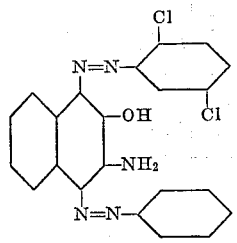

The 1-phenylazo-2-amino-3-hydroxynaphthalene used above as initial dyestuff may be prepared as follows:—

93 parts of aniline are dissolved in 300 parts of dilute hydrochloric acid and 520 parts of water. The solution is cooled to 0° by means of 520 parts of ice and then diazotized with aid of a solution of 72 parts of sodium nitrite in 150 parts of water. The nitrous acid in excess is then removed by means of urea. The diazo solution is thereupon added in drops at 0°–5° to a solution of 159 parts of 2-hydroxy-3-amino-naphthalene in 159 parts of dilute hydrochloric acid and 1590 parts of water. Already after a short time an orange precipitate separates. There follows stirring for 24 hours at 0°–5° and hydroextracting, and the residue thus obtained is washed with water. The dyestuff is then dissolved in dilute sodium hydroxide, separated from a small quantity of o-hydroxy-azo-dyestuff by filtration, and precipitated by means of dilute hydrochloric acid. By crystallization from alcohol there is obtained a substance having a melting point of 161–162°.

Example 2

A preparing bath is made up in the following manner:

6 grams of 1-phenylazo-2-amino-3-hydroxynaphthalene is dissolved in 300 grams of hot water by the addition of 10 grams of caustic soda solution of 30 per cent strength, 8 grams of Turkey red oil and 25 grams of sodium chloride, and the whole is diluted to one liter. Cotton yarn is impregnated with this preparing solution and is then well wrung out and developed in a diazo solution of a strength corresponding to 2 grams of 4-(4'-methyl)-phenoxyacetylamino - 2:5 - dimethoxy-1-aminobenzene per liter which has previously been neutralized with sodium acetate. A pure navy-blue dyeing is produced, which possesses very good fastness properties. The new dyestuff very probably corresponds to the formula

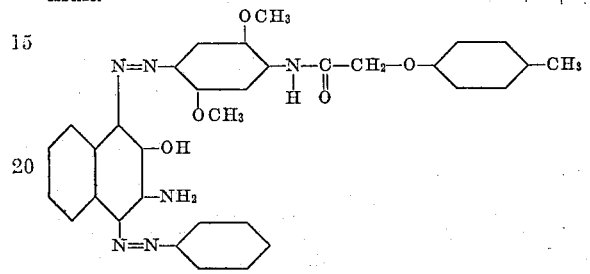

If the 4-(4'-methyl)-phenoxyacetylamino-2:5-dimethoxy-1-aminobenzene used in this example be replaced by 4-amino-5-methoxy-azobenzene, a black dyeing possessing similar fastness properties is obtained.

Example 3

Cotton yarn is impregnated with a solution containing 6 grams of 1-(4'-chloro)-phenylazo-2-amino-3-hydroxynaphthalene (prepared from 1-amino-4-chlorobenzene according to the data of the last paragraph of Example 1), 10 c. c. of caustic soda solution of 36° Bé. strength, 5 c. c. of Turkey red oil, and 25 grams of sodium chloride per liter. It is then well wrung out and is developed in a diazo solution corresponding to 2 grams of 1-amino-2-methyl-4-chlorobenzene per liter, which has been neutralized previously with sodium acetate. A pure corinth-red shade is produced, which possesses very good fastness properties.

Coupling components of this nature may also be applied on piece goods and in printing.

The following table illustrates the shades of dyeings obtained by other dyestuffs obtainable by the present process:

| | Diazo component | Coupling component | Colour on cotton |
|---|---|---|---|
| 1 | 2:5-dichloroaniline | 1-(4'-methoxy)-phenylazo-2-amino-3-hydroxynaphthalene. | Dark brown. |
| 2 | 4:4'-dichloro-2-amino-1:1'-diphenylether | ....do.... | Do. |
| 3 | 1-amino-2-methoxy-5-chlorobenzene | ....do.... | Do. |
| 4 | 1-amino-2-methyl-5-nitrobenzene | ....do.... | Do. |
| 5 | 1-amino-2-methoxy-4-nitrobenzene | ....do.... | Do. |
| 6 | 1-amino-2-methyl-4-chlorobenzene | ....do.... | Do. |
| 7 | 1-amino-2:5-diethoxy-4-benzoylamino-benzene. | ....do.... | Black. |
| 8 | p-Chlorophenyl ester of anthranilic acid | 1-(2'-methyl-4'-chloro)-phenylazo-2-amino-3-hydroxynaphthalene. | Dark brown. |
| 9 | 2:5-dichloroaniline | ....do.... | Do. |
| 10 | 4-chloro-2-amino-diphenylether | ....do.... | Do. |
| 11 | 1-amino-2-methyl-4-chlorobenzene | ....do.... | Do. |
| 12 | 1-amino-2-methoxy-5-chlorobenzene | ....do.... | Do. |
| 13 | 4-(4'-methyl)-phenoxyacetylamino-2:5-diethoxy-1-amino-benzene. | ....do.... | Black. |
| 14 | 1-amino-2:5-diethoxy-4-benzoylamino-benzene. | ....do.... | Do. |
| 15 | ....do.... | 1-phenylazo-2-amino-3-hydroxynaphthalene | Navy blue. |
| 16 | 4:4'-diamino-5-methoxy-2-methyl-1:1'-azo-benzene. | ....do.... | Black. |
| 17 | Dianisidine | ....do.... | Do. |
| 18 | 4-amino-4'-methoxy-diphenylamine | ....do.... | Do. |
| 19 | 1-aminonaphthalene-4-azo-(2'-ethoxy)-benzene. | ....do.... | Do. |
| 20 | 4-(2'-methyl)-phenoxyacetylamino-2:5-diethoxy-1-aminobenzene. | ....do.... | Navy blue. |
| 21 | 4-(4'-methyl)-phenoxyacetylamino-2:5-diethoxy-1-aminobenzene. | ....do.... | Do. |

| | Diazo component | Coupling component | Colour on cotton |
|---|---|---|---|
| 22 | m-Chloroaniline | 1-(1')-naphthylazo-2-amino-3-hydroxynaphthalene | Brown. |
| 23 | 2:5-dichloroaniline | ----do---- | Do. |
| 24 | 4:4'-dichloro-2-amino-diphenylether | ----do---- | Dark brown. |
| 25 | 1-amino-2-methoxy-5-chlorobenzene | ----do---- | Do. |
| 26 | 1-amino-2-nitrobenzene | ----do---- | Brown. |
| 27 | 1-amino-2-nitro-4-methylbenzene | ----do---- | Do. |
| 28 | 1-amino-2-methyl-4-chlorobenzene | ----do---- | Dark brown. |
| 29 | α-Aminoanthraquinone | ----do---- | Brown. |
| 30 | β-Naphthylamine | ----do---- | Garnet. |
| 31 | 4-(2'-methyl)-phenoxyacetylamino-2:5-diethoxy-1-aminobenzene. | ----do---- | Black. |
| 32 | 1-amino-2-nitrobenzene | 1-(2'-methoxy)-phenylazo-2-amino-3-oxynaphthalene | Brown. |
| 33 | 1-amino-2-methoxy-5-nitrobenzene | ----do---- | Do. |
| 34 | 4-chloro-2-amino-1:1'-diphenylether | ----do---- | Do. |
| 35 | 1-amino-2-methyl-4-nitrobenzene | ----do---- | Do. |
| 36 | 1-amino-2-nitro-benzene-4-methoxybenzene. | ----do---- | Do. |
| 37 | 4-amino-5-methoxy-1:1'-azobenzene | ----do---- | Dark brown. |
| 38 | 4:4'-dichloro-2-amino-1:1'-diphenylether | 1-(2'-nitro-4'-methyl)-phenylazo-2-amino-3-hydroxynaphthalene. | Do. |
| 39 | 4-chloro-2-amino-1:1'-diphenylether | ----do---- | Do. |

The formula of the dyestuff No. 4 is:

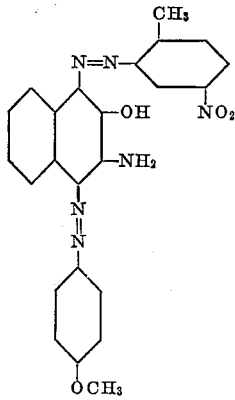

The formula of the dyestuff No. 13 is:

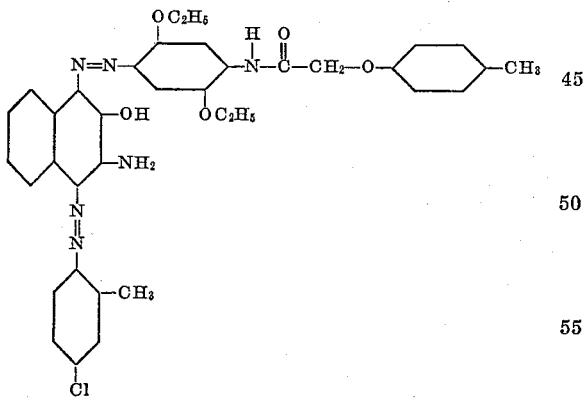

The formula of the dyestuff No. 26 is:

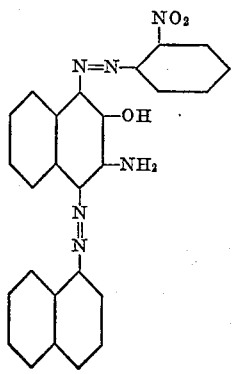

What we claim is:
1. The azo dyestuffs of the general formula

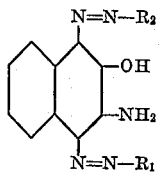

in which $R_1$ and $R_2$ each stands for a member of the group consisting of aryl of the benzene series and aryl of the naphthalene series, which dyestuffs are dark powders and which, when produced on the fibre, colour it in fast shades of bordeaux, violet, black and brown.

2. The azo dyestuffs of the general formula

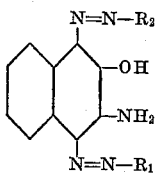

in which $R_1$ stands for aryl of the benzene series and $R_2$ also stands for aryl of the benzene series, which dyestuffs are dark powders and which, when produced on the fibre, colour it in fast shades of bordeaux, violet, black and brown.

3. The dyestuff of the formula

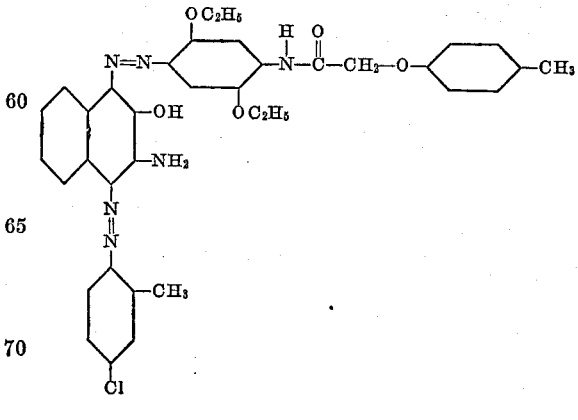

4. The dyestuff of the formula
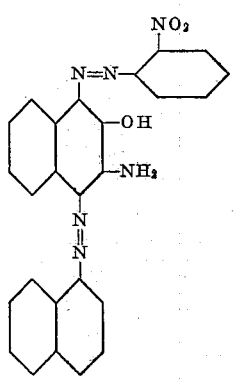
5. The dyestuff of the formula
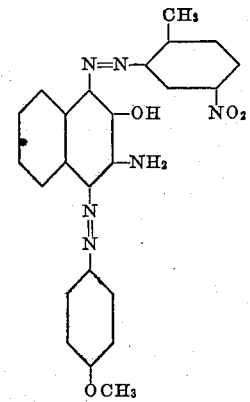
GÉRALD BONHÔTE.
CARL APOTHEKER.